(12) United States Patent
Benson

(10) Patent No.: US 10,030,522 B2
(45) Date of Patent: Jul. 24, 2018

(54) BLADE WITH METALLIC LEADING EDGE AND ANGLED SHEAR ZONES

(71) Applicant: ROLLS-ROYCE plc, London (GB)

(72) Inventor: Christopher Benson, Swindon (GB)

(73) Assignee: ROLLS-ROYCE plc, London (GB)

( * ) Notice: Subject to any disclaimer, the term of this patent is extended or adjusted under 35 U.S.C. 154(b) by 275 days.

(21) Appl. No.: 14/954,221

(22) Filed: Nov. 30, 2015

(65) Prior Publication Data

US 2016/0177731 A1  Jun. 23, 2016

(30) Foreign Application Priority Data

Dec. 19, 2014 (GB) .................................. 1422738.3

(51) Int. Cl.
| | |
|---|---|
| F01D 5/28 | (2006.01) |
| F01D 5/14 | (2006.01) |
| F01D 21/04 | (2006.01) |
| F02C 7/05 | (2006.01) |

(52) U.S. Cl.
CPC .............. *F01D 5/147* (2013.01); *F01D 5/282* (2013.01); *F01D 21/045* (2013.01); *F02C 7/05* (2013.01); *F05D 2220/36* (2013.01); *F05D 2230/232* (2013.01); *F05D 2240/303* (2013.01); *F05D 2250/38* (2013.01); *F05D 2260/311* (2013.01)

(58) Field of Classification Search
USPC ............................................................ 415/9
See application file for complete search history.

(56) References Cited

U.S. PATENT DOCUMENTS

| 4,111,600 A | 9/1978 | Rothman et al. |
| 4,944,655 A * | 7/1990 | Merz ...................... B64C 11/26 416/146 R |
| 7,780,410 B2 | 8/2010 | Kray et al. |
| 8,814,527 B2 | 8/2014 | Huth et al. |
| 2008/0075601 A1 | 3/2008 | Giusti et al. |
| 2010/0054937 A1 | 3/2010 | Beckford et al. |
| 2010/0054945 A1 | 3/2010 | McMillan et al. |
| 2012/0301292 A1 | 11/2012 | Deal et al. |
| 2013/0004323 A1 | 1/2013 | Hansen et al. |
| 2013/0008027 A1 | 1/2013 | Franchet et al. |
| 2013/0199934 A1 | 8/2013 | Parkos, Jr. et al. |

(Continued)

FOREIGN PATENT DOCUMENTS

| EP | 1 022 432 A2 | 7/2000 |
| EP | 1 754 857 A2 | 2/2007 |
| EP | 2 159 378 A2 | 3/2010 |

(Continued)

OTHER PUBLICATIONS

Jun. 7, 2016 Search Report issued in European Patent Application No. 15196977.

(Continued)

*Primary Examiner* — Woody Lee, Jr.
*Assistant Examiner* — Theodore Ribadeneyra
(74) *Attorney, Agent, or Firm* — Oliff PLC

(57) ABSTRACT

A turbomachine blade comprising a blade tip and a metallic leading edge having a plurality of shear zones angled to the blade tip, wherein the shear strength of the shear zones is less than the shear strength of the remainder of the leading edge, such that in the event of an impact shear is initially initiated at the shear zones.

11 Claims, 5 Drawing Sheets

(56) References Cited

U.S. PATENT DOCUMENTS

2013/0239586 A1    9/2013  Parkin et al.
2015/0218953 A1    8/2015  Bottome

FOREIGN PATENT DOCUMENTS

FR       2 994 708 A1    2/2014
FR       2994708 A1 *  2/2014  ............. F01D 9/041

OTHER PUBLICATIONS

May 30, 2016 Search Report issued in European Patent Application No. 15196975.
Jun. 15, 2015 Search Report issued in British Patent Application No. GB1422741.7.
Jun. 15, 2015 Search Report issued in British Patent Application No. GB1422737.5.
Jun. 16, 2015 Search Report issued in British Patent Application No. GB1422738.3.
U.S. Appl. No. 14/954,355, filed Nov. 30, 2015 in the name of Christopher Benson.
U.S. Appl. No. 14/954,087, filed Nov. 30, 2015 in the name of Christopher Benson.
Nov. 2, 2017 Office Action issued in U.S. Appl. No. 14/954,087.
Nov. 2, 2017 Office Action issued in U.S. Appl. No. 14/954,355.

* cited by examiner

BLADE WITH METALLIC LEADING EDGE AND ANGLED SHEAR ZONES

FIELD OF INVENTION

The present invention relates to a fan blade for a gas turbine engine.

BACKGROUND

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven directly off an additional lower pressure turbine in the engine core.

A fan of the gas turbine engine generally includes a plurality of blades mounted to a hub. A fan casing and liner circumscribe the fan blades. Fan blades may be metallic or have a composite construction. Generally a composite fan blade will have a composite non-metallic core, e.g. a core having fibres within a resin matrix. Typically a composite blade will have a metallic leading edge to prevent erosion and to protect the blade against impact damage from foreign objects. The metallic leading edge generally wraps around the leading edge of the composite core and covers a portion of the suction surface of the blade and a portion of the pressure surface of the blade.

In the event of the leading edge becoming detached from the remainder of the fan blade (e.g. if a fan blade is released from the hub), the construction of the leading edge means that it can apply high impact forces to the fan casing. The fan casing and liner can be designed to absorb the impact energy imparted by a released blade and leading edge. However, this generally leads to a heavy system that has associated efficiency penalties.

SUMMARY OF INVENTION

A first aspect of the invention provides a turbomachine blade comprising blade tip and a metallic leading edge having a plurality of shear zones angled to the blade tip, wherein the shear strength of the shear zones is less than the shear strength of other regions of the leading edge.

In the present application, reference to an angled plane refers to an angle greater than 0°.

The shear zones may be acutely or obtusely angled to the blade tip.

The provision and angling of the shear planes means that in the event of an impact, shear can be initially initiated at the shear zones. The use of a plurality of shear zones promotes progressive collapse of the leading edge so as to increase energy absorption during a fan blade off event, which in turn reduces the loading requirements for the fan case. During progressive collapse of the leading edge, each shear zone is intended to shear so that the leading edge breaks up into multiple pieces so as to absorb impact energy.

For example, the shear zones may be angled in a plane defined by a spanwise and a chordwise direction of the blade. Each shear zone may define a slip plane. The slip plane may be angled.

The shear strength of the shear zones may be less than the shear strength of the remainder of the leading edge.

The blade may comprise a core. The core may be a composite core or a metallic core. The metallic leading edge may be provided at a leading edge or end of the core.

The blade may have a leading edge and a trailing edge; and a suction surface extending between the leading edge and the trailing edge and a pressure surface extending between the leading edge and the trailing edge. In the present application, a chordwise direction is a direction extending between the leading edge and the trailing edge; a spanwise direction is a direction extending between the tip of the blade and the root of the blade; and the thickness direction is a direction extending between the pressure surface and the suction surface of the blade.

The plurality of shear zones may be distributed along the leading edge in a spanwise direction.

The zones may be angled towards a tip of the blade in a direction from the leading edge towards a trailing edge of the blade. For example, the angle between the zones and the tip of the blade may be acute. That is, the angle from the zone to the tip in a clockwise direction may be acute. In use, the zones may form an acute angle with a longitudinal axis of the turbomachine (e.g. the angle from the shear zone to the longitudinal axis in a clockwise direction may be acute).

The zones may be angled such that, in use, the angle between the zones and the longitudinal axis of the turbomachine is equal to or between 30° and 80°. For example, equal to or less than 70° or equal to or more than 40°, e.g. 45° or 60°.

The metallic leading edge may comprise a plurality of sections arranged and adjacently attached in a spanwise direction. The surfaces of the sections intended to be bonded to another section may be angled to an adjacent surface.

The shear zones may include the bondline between the adjacently attached sections. The sections may be attached using an adhesive, metal bonding process, or mechanical connection.

The sections may be welded together.

One or more cavities may be provided in the shear zones.

The leading edge may be thinner in a region of the shear zones compared to regions directly adjacent said shear zones.

The shear zones may be each angled in a direction defined by a thickness direction and a spanwise direction.

The metallic leading edge may include two wings and a fore portion provided between the two wings.

The leading edge may be formed in two portions, the two portions being connected together in the fore portion.

Each of the shear zones in the region of the wings may be angled in a direction defined by a thickness direction and a spanwise direction.

The shear zones may be angled on each wing such that an innermost position of the shear zone is nearer to the blade tip than an outermost position.

The leading edge may be made by additive manufacture. Alternatively, by way of example only, the leading edge may be machined from solid, forged, cast or metal injection moulded.

The metallic leading edge may comprise a plurality of sections arranged in a spanwise direction, the sections being connected together by a connection having a weaker shear strength than said sections, and the connection between the sections being angled to a tip of the blade.

The surfaces of the sections intended to be bonded to an adjacent section may be angled to an adjacent side, such that the surface is angled to the blade tip.

The sections may be welded together.

A second aspect of the invention provides a gas turbine engine comprising a fan and a fan case that circumscribes the fan, wherein the fan comprises a plurality of blades according to the first aspect.

DESCRIPTION OF DRAWINGS

The invention will now be described, by way of example only, with reference to the accompanying drawings in which.

DETAILED DESCRIPTION

Figure 1:
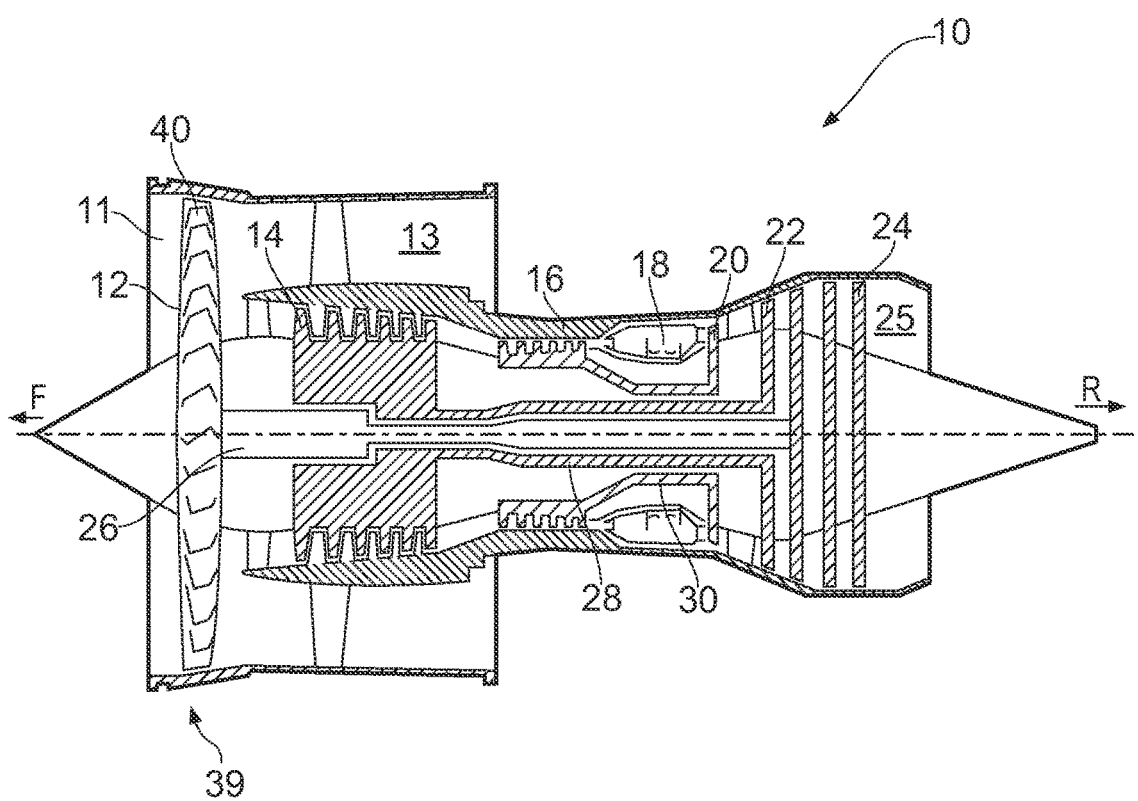
FIG. 1 illustrates a gas turbine engine.

With reference to FIG. 1 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine thrust.

The intake fan 12 comprises an array of radially extending fan blades 40 that are mounted to the shaft 26. The shaft 26 may be considered a hub at the position where the fan blades 40 are mounted. The fan blades are circumscribed by a fan casing 39. The fan casing includes a liner proximal to the fan blades.

In the present application a forward direction (indicated by arrow F in FIG. 3) and a rearward direction (indicated by arrow R in FIG. 3) are defined in terms of axial airflow through the engine 10.

Figure 2:
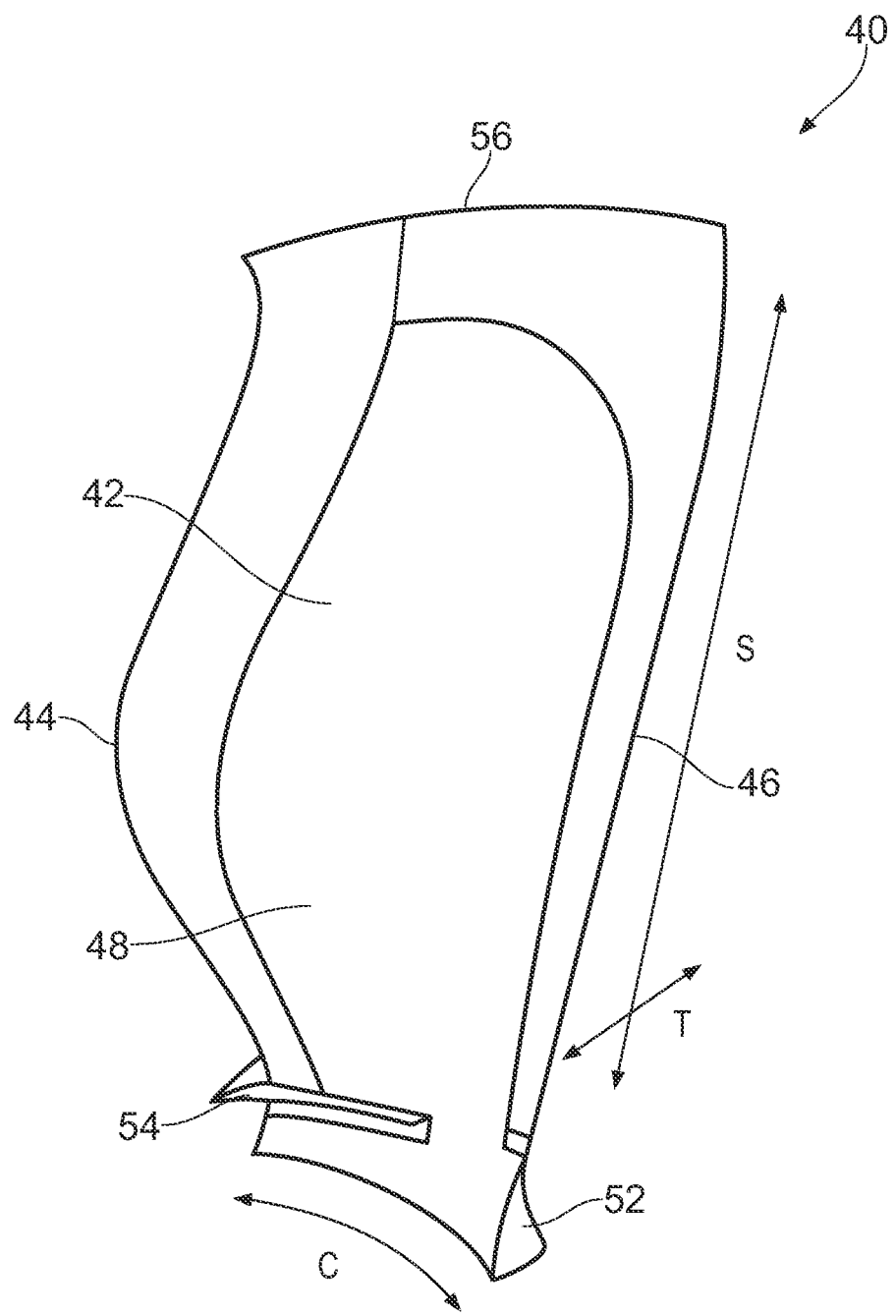
FIG. 2 illustrates a composite fan blade.

Referring to FIG. 2, the fan blades 40 each comprise an aerofoil portion or core 42 having a leading edge 44, a trailing edge 46, a concave pressure surface 48 extending from the leading edge to the trailing edge and a convex suction surface (not shown in FIG. 2 but indicated at 50 in FIG. 3) extending from the leading edge to the trailing edge. The fan blade has a root 52 via which the blade can be connected to the hub. The fan blade has a tip 56 at an opposing end to the root. The fan blade may also have an integral platform 54 which may be hollow or ribbed for out of plane bending stiffness. The fan blade includes a metallic leading edge 44 covering the leading edge of the core and extending along a portion of the pressure surface and suction surface of the core. The fan blade also includes a metallic trailing edge covering the trailing edge of the core and extending along a portion of the pressure surface and the suction surface of the core.

In the present application, a chordwise direction C is a direction extending between the leading edge and the trailing edge; a spanwise direction S is a direction extending between the tip of the blade and the root 52 of the blade 40; and the thickness direction T is a direction extending between the pressure surface 48 and the suction surface 50 of the blade 40.

Figure 3:
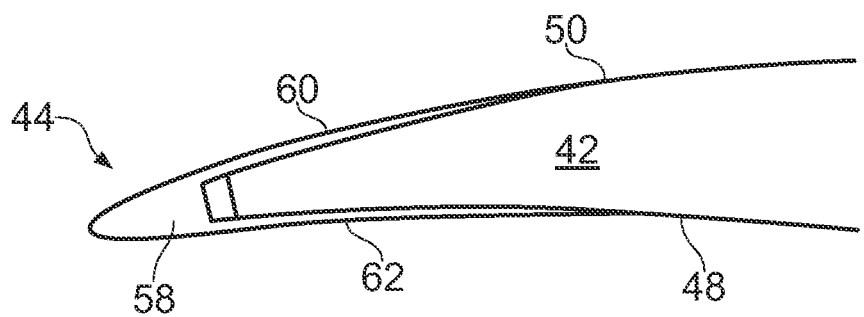
FIG. 3 illustrates a partial cross section of the composite fan blade of FIG. 2.
Figure 4:
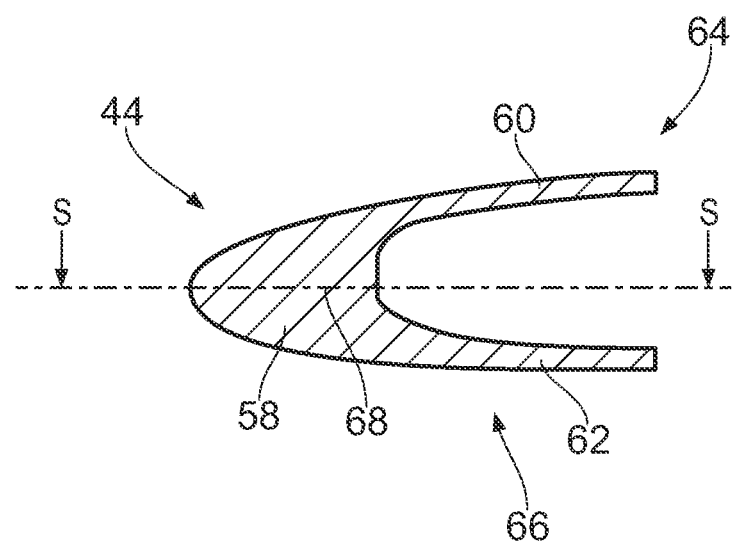
FIG. 4 illustrates a section view of a leading edge of the fan blade of FIG. 2.

Referring now to FIGS. 3 and 4, the metallic leading edge 44 includes a fore portion 58 provided between two wings 60, 62. One of the wings 60 extends partially along the suction side of the core 42 and the other of the wings 62 extends partially along the pressure side of the core.

Figure 5:
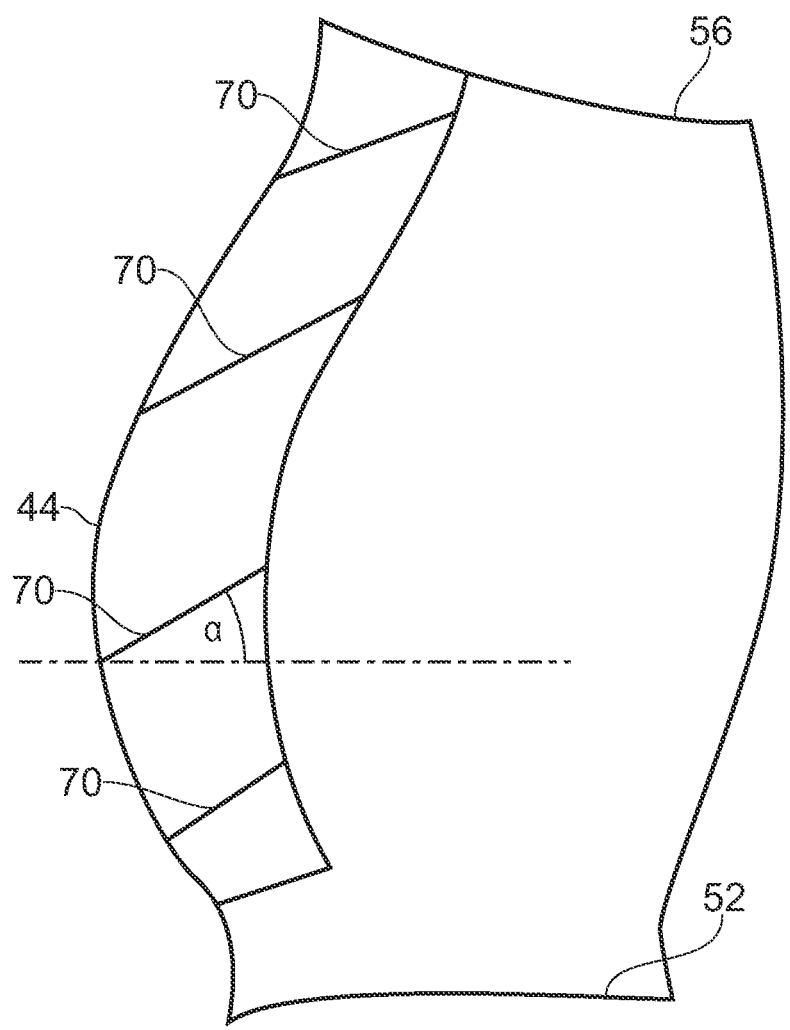
FIG. 5 illustrates a schematic of the fan blade of FIG. 2 viewed from the pressure side and illustrates the position of a plurality of shear zones.

Referring to FIG. 5, the leading edge 44 includes a plurality of shear zones defining slip planes 70. Four slip planes are illustrated in FIG. 4, but the number of slip planes may be more or less than four, and the number of slip planes can be selected to promote the desired leading edge failure in the event of the fan blade being released from the fan during use. The slip planes extend the full chordal length of the leading edge, but in alternative embodiments the slip planes may be limited to the fore portion and a forward region of the wings.

The slip planes 70 are angled to the root 52 or the tip 56 of the blade. In the present embodiment, the slip planes are angled towards the tip in a direction from the leading edge to the trailing edge, in this way, in use, the slip planes are acutely angled (indicated by angle α) to an axis parallel to the longitudinal axis of the gas turbine engine 10. The angle of the slip planes can be selected to achieve the desired failure mode for a given blade and casing design.

Figure 6:
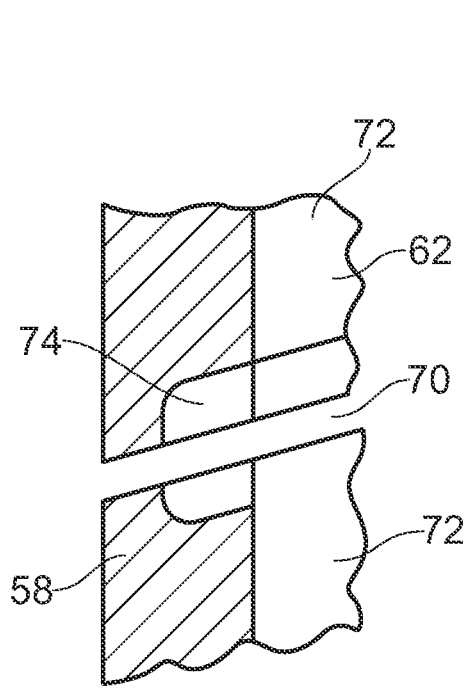
FIGS. 6 and 7 illustrate a partial sectional view of the leading edge of FIG. 4 along the line S-S.
Figure 7:
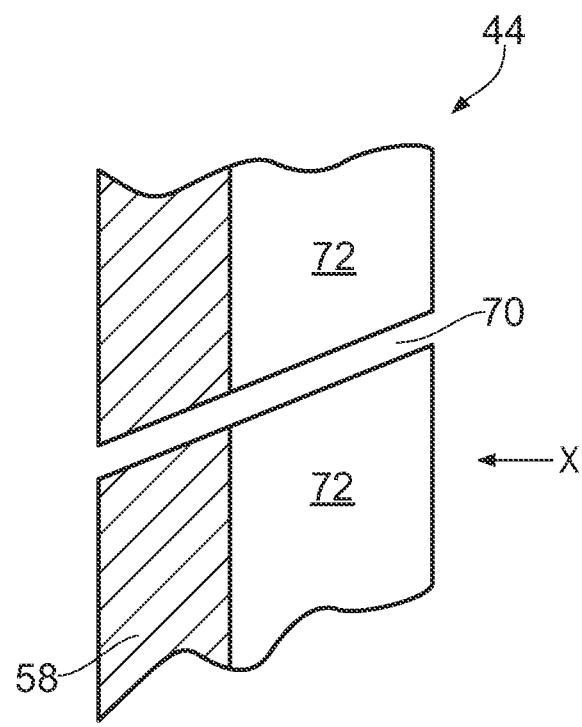
Figure 8:
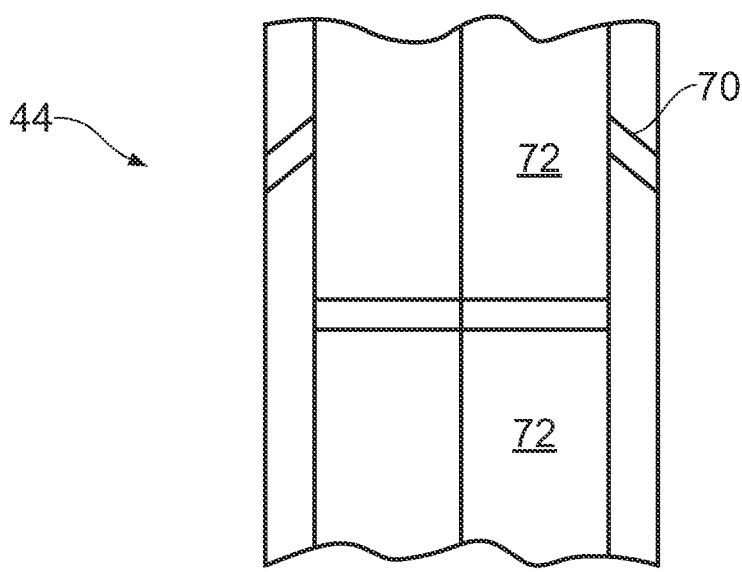
FIG. 8 illustrates a partial view of the leading edge of FIG. 7 in the direction of the arrow X.

Referring to FIGS. 6 to 8, the slip planes 70 may be formed in a number of different ways. In one embodiment, the leading edge 44 may be formed from a plurality of sections 72 adjacently stacked in a spanwise direction and attached (e.g. welded) together. In such embodiments the slip planes 70 may be defined by the bondline between the stacked sections. The bondline may be treated and/or may have a pattern of bonded and non-bonded areas so as to adapt the bondline to shear at a desired predetermined shear load.

Additionally or in alternative embodiments, the leading edge 44 may be thinned in the region of the slip planes 70. For example, a groove 74 on the outer and/or inner surface of the leading edge may be provided. Alternatively, the weld relief (or weld preparation) may contribute to thinning the leading edge.

Referring in particular to FIG. 8, as well as being angled in a leading edge to trailing edge direction (e.g. a chordwise direction C), the slip planes 70 may also be angled in a thickness direction. In such embodiments, local thinning of the leading edge 44 (e.g. by providing grooves 74 or cavities) may be used to angle the slip planes in the thickness direction. In the embodiment illustrated in FIG. 8, the slip planes are angled so that the slip plane on the inner side of each wing 60, 62 is angled towards the blade tip.

Referring back to FIG. 4, in the present embodiment the metallic leading edge 44 is formed of a first portion 64 and a second portion 66 connected together in a region of the fore portion 58. Each of the first portion and the second portion form one wing 60, 62 and part of the fore portion 58. In the present embodiment, the first portion and the second portion connect in a central region of the fore portion. However, in alternative embodiments the leading edge may be formed as a single component.

To manufacture a blade 40 of the described embodiment, the first portion and the second portion may be made using additive manufacture, machining from solid or any suitable metal forming method. The first portion may be bonded to the second portion using welding, e.g. electron beam welding, or diffusion bonding.

In embodiments where the shear planes are defined by a weld between two sections, the heat treatment applied to the weld may be selected so as to achieve the desired shear strength in the region of the weld. In exemplary embodiments, heat treatment may be omitted.

It will be appreciated by one skilled in the art that, where technical features have been described in association with one or more embodiments, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

For example, in the described embodiments the leading edge is manufactured in two portions that are bonded together. However, in alternative embodiments the leading edge may be made as a single component. When the leading edge is manufactured as a single component the leading edge may be manufactured using additive layer manufacture and the shear zones may be provided by including voids, cavities and/or thinned regions in the leading edge.

In the present application the leading edge has been shown as having two wings, but in alternative embodiments the leading edge may have a "bullet" shape, that is be shaped to exclude the wings.

The fan blade described is a composite blade with a metallic leading edge. However, the leading edge may be a leading edge of a metallic blade (e.g. a solid or hollow metallic blade). In such embodiments, the leading edge may be integrally formed with the core of the blade.

The invention claimed is:

1. A fan blade comprising a blade tip and a metallic leading edge having two wings and a fore portion provided between the two wings and having a plurality of shear zones angled to the blade tip, wherein the shear strength of the shear zones is less than the shear strength of other regions of the leading edge, such that in the event of an impact, shear is initially initiated at the shear zones, wherein
the plurality of shear zones including shear zones located in the wings defining sections of the wings tapered spanwise in a direction defined by a thickness direction and tapered cordwise in a direction defined by the span, the shear zones are angled such that an innermost position of the shear zones is nearer to the blade tip than an outermost position.

2. The blade according to claim 1, wherein the zones are acutely angled towards a tip of the blade in a direction from the leading edge towards a trailing edge of the blade.

3. The blade according to claim 2, wherein the zones are angled such that, in use, the angle between the zones and the tip of the blade is equal to or between 30° and 70°.

4. The blade according claim 1, wherein the metallic leading edge comprises a plurality of sections arranged and adjacently attached in a spanwise direction.

5. The blade according to claim 4, wherein the shear zones include a bondline between the adjacently attached sections.

6. The blade according to claim 4, wherein the sections are welded together.

7. The blade according to claim 1, wherein the leading edge is thinner in a region of the shear zones compared to regions directly adjacent said shear zones.

8. The blade according to claim 1, wherein the shear zones are each angled in a direction defined by a thickness direction and a spanwise direction.

9. The blade according to claim 1, wherein the leading edge is formed in two portions, the two portions being connected together in the fore portion.

10. A gas turbine engine comprising a fan case that circumscribes a fan having a plurality of blades according to claim 1.

11. A fan blade comprising a metallic leading edge, wherein the metallic leading edge comprises a plurality of sections arranged in a spanwise direction, the sections being connected together by a connection having a weaker shear strength than said sections, and the connection between the sections being angled to the leading edge, the metallic leading edge further comprising two wings and a fore portion provided between the two wings, wherein
the connection is located within the region of the wings tapered spanwise in a direction defined by a thickness direction and tapered cordwise in a direction defined by the span, the connection is angled such that an innermost position of the connection is nearer to the blade tip than an outermost position.

* * * * *